Patented Nov. 11, 1924.

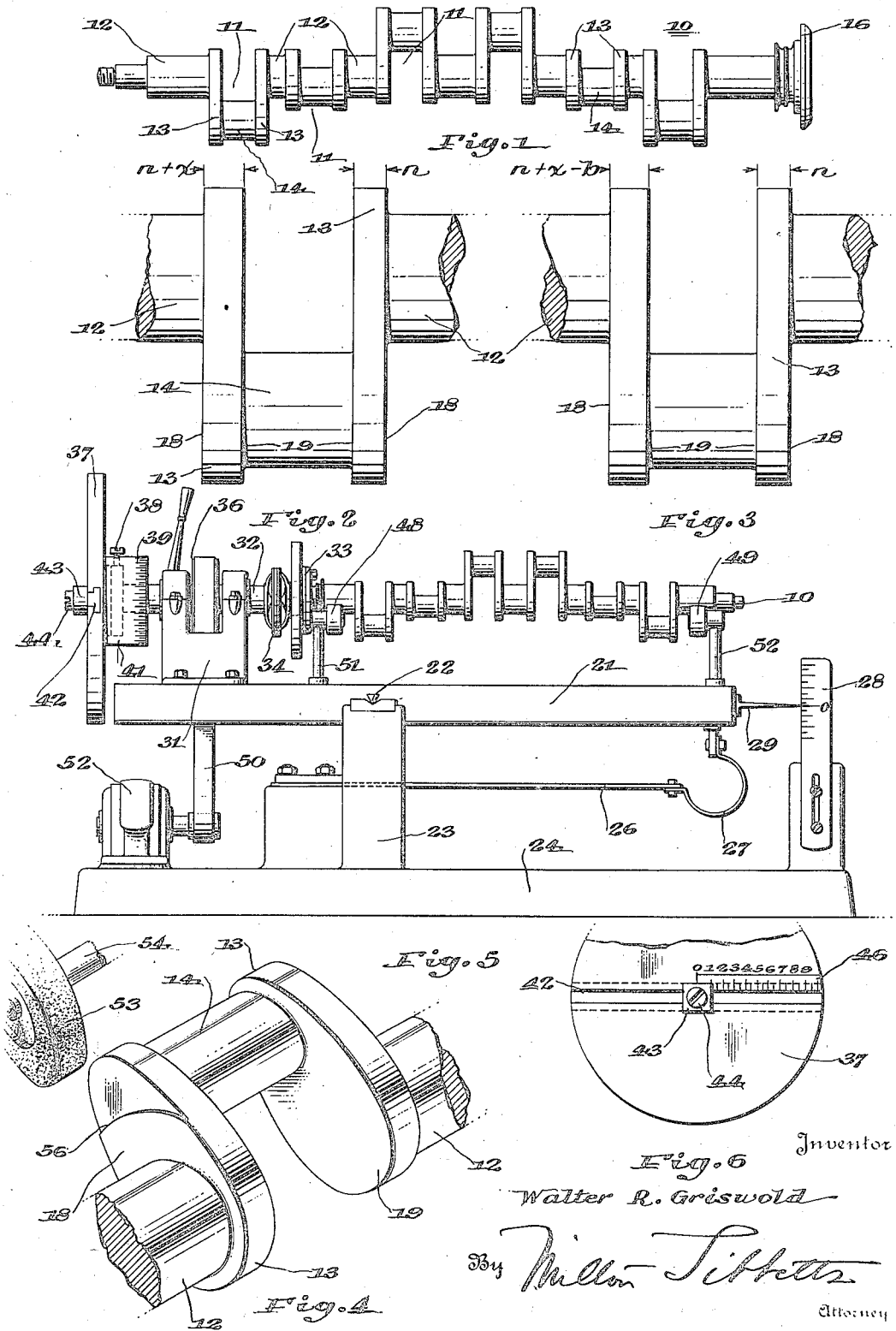
Nov. 11, 1924.
W. R. GRISWOLD
METHOD OF BALANCING CRANK SHAFTS
Filed Feb. 6, 1924
1,515,034

1,515,034

UNITED STATES PATENT OFFICE.

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN.

METHOD OF BALANCING CRANK SHAFTS.

Application filed February 6, 1924. Serial No. 691,079.

*To all whom it may concern:*

Be it known that I, WALTER R. GRISWOLD, a citizen of the United States, and resident of Detroit, Wayne County, State of Michigan, have invented certain new and useful Improvements in Methods of Balancing Crank Shafts, of which the following is a specification.

This invention relates to internal combustion engines, particularly to the crank shafts thereof. It has for an object to provide a method for producing a balanced crank shaft for such engines which is simpler, more accurate, and less expensive than methods now in use, and which does not weaken the finished shaft, nor disfigure it in any way.

Another object of the invention is to provide a method of balancing crank shafts of the type having flat crank cheeks.

Other objects of the invention will appear from the following description taken in connection with the drawings, and in which:

Fig. 1 is a side elevation of a six throw crank shaft adapted to be balanced by the present method;

Figs. 2 and 3 are companion views in elevation of a portion of the shaft shown in Fig. 1, enlarged to show the relative thicknesses of the crank arms or cheeks before and after correction for balance respectively;

Fig. 4 is an enlarged perspective view of one of the cranks illustrated in Figs. 2 and 3, showing the grinding operation thereon partially completed and illustrating the action of the grinding wheel thereon;

Fig. 5 is a diagrammatic representation in side elevation of a machine capable of determining the unbalance of shafts, showing a shaft similar to that of Fig. 1 mounted in position thereon, and Fig. 6 is an end elevation of the dial of the machine shown in Fig. 5.

The methods by which the crank shafts of internal combustion engines have heretofore been corrected for unbalance have not proved to be satisfactory. Such methods generally involve the removal of metal from the shaft, in such a way as to set up a counter-force or system of forces capable of offsetting the force or forces of the original unbalance. Such removal of metal is usually accomplished by drilling holes in convenient portions of the crank arms or cheeks, or by chipping or filing, and such practices have frequently resulted in a serious weakening of the crank shaft, particularly in the highly stressed portions thereof. Furthermore, machine operations of the nature indicated have almost invariably resulted in the disfigurement of the shaft, as will be readily understood.

The present invention contemplates a method of manufacture of crank shafts in which the unbalance is controlled, qualitatively but not quantitatively, during all the various machine operations thereon. It is applicable to shafts having any number of throws, and to any design of shaft, although especially adapted for use on shafts of the type having flat, machined crank cheeks. It will be described in connection with a six throw, seven bearing crank shaft of the flat-cheeked type referred to, but it is to be understood that the invention is not limited in application to shafts of this type.

This method of balancing presupposes certain limits within which the unbalance of any group of shafts of a given type and design will fall. For every particular design of shaft a preliminary survey is first conducted to establish the practical limits of such probable unbalance.

The correction for the unbalance in any given shaft is to be accomplished in the practice of this invention by the removal of metal from the shaft, but it is evident that metal cannot be removed from any place that may be desired. For example, metal cannot be removed from one of the bearing surfaces, nor from one of the crank pins. It is usually most convenient to remove metal from the crank cheeks, and heretofore this has ordinarily been done by drilling holes in the peripheries of certain cheeks. However, such procedure may, and usually does unduly reduce the strength of these highly stressed members. In the present invention the initial unbalance is arbitrarily placed in certain predetermined crank cheeks during the manufacture of the shaft and is maintained in those cheeks until the shaft is completed. This is accomplished by giving to those cheeks chosen for the purpose, dimensions somewhat in excess of the minimum allowable cheek dimensions, as determined by the design of the shaft, and such excess dimensions are made sufficiently great to permit the removal from the cheek of an amount of metal equal to that required by the probable correction for unbalance as determined by the preliminary survey.

After determination of the actual unbalance, and of the weight of metal which must be removed in correction thereof, this metal is removed from the designated cheeks in any convenient way, as by grinding. The grinding is preferably effected on the flat side of the cheek, although the periphery of the cheeks may be ground if desired. If the grinding is to be done on the periphery of the cheek, the radii thereof are slightly increased in anticipation thereof, so that the increased perimeter will provide excess metal, which may be removed in the balancing process. By the use of the grinding operation, small amounts of metal may be evenly removed from the crank cheek with great accuracy, thus insuring the shaft against the presence of unsightly holes, or other disfigurement. Furthermore, since the increased size of the cheek is more than enough to compensate for the amount of metal removed, the crank cheek is in no way weakened by the process.

The determination of the cheeks into which the unbalance is to be placed is made largely in accordance with the type of shaft under consideration and the method which is to be employed for calculating the location and amount of the unbalancing mass. The proper selection may be made by choosing those adjacent cheeks nearest opposite ends of the shaft of which the crank planes determine sectors having the same angular position on the circle of crank travel.

Referring to the drawing, at 10 is shown an internal combustion engine crank shaft of the familiar six throw type, having cranks 11 separated by bearings 12. Each of the cranks 11 comprises a pair of arms or cheeks 13 connected by a suitable crank pin 14, preferably integral therewith in the usual manner. There are twelve of the cheeks 13 in the six throw shaft shown in Fig. 1, and these are generally numbered consecutively from one to twelve, beginning with the front end of the shaft, which is at the left hand end of Fig. 1, and are referred to by number. The other end of the shaft is provided with a flange 16, for attachment to a fly wheel, or other driven part (not shown).

As illustrated, each of the cheeks 13 is of a flat, oval formation having parallel outer sides or faces 18, and inner faces 19 between which the crank pin 14 is disposed. The cheeks 13 are preferably finished all over and have a certain minimum allowable thickness $n$ providing a certain minimum strength designed in accordance with the conditions under which the engine is to operate.

Dynamic balance in a rotating shaft is generally secured by counterbalancing the shaft in two parallel planes transverse to its axis, and located preferably near its ends. If for example, it is assumed that the unbalance is due to a heavy spot at some unknown point in the shaft, then in balancing the shaft no effort need be made to find the exact location of this heavy spot. Instead, two planes are arbitrarily selected in which may be placed weights to counteract the unbalance caused by the unknown heavy spot. If this spot happens to be nearer one correction plane than to the other correction plane, then in order to secure dynamic equilibrium the correction weights supplied to the respective planes must be of different sizes. The sum of the two correction weights, of course, must equal the weight of the heavy spot which causes the unbalance, but the heavier correction weight must be placed in the nearer correction plane and the lighter correction weight in the further correction plane.

It will be understood that in a six throw crank shaft, as illustrated in Fig. 1, cranks 1 and 6, cranks 2 and 5, and cranks 3 and 4, are each disposed in one of three planes about the crank shaft, these planes being spaced equally 120° apart. It will be furthermore apparent that crank cheeks 2 and 3 are adjacent cheeks which are disposed in separate planes near the forward end of the shaft, thus defining a sector of 120°, and that cheeks 10 and 11 define a similar sector at the rear end of the shaft, this last named sector having the same angular relation with respect to the shaft as that of the first named sector. The cranks defining these sectors lie aproximately in planes which may be taken as the correction planes above referred to. For this reason it has been found advantageous to use the above mentioned cheeks 2, 3, 10 and 11 in the correction of the shaft for unbalance, although other combinations of cheeks may be selected.

Accordingly, each of these cheeks is forged thicker than the remainder of the engine crank cheeks and this excess thickness is maintained throughout the preliminary machine operations on the shaft, so that these cheeks are completed, except for the balancing operation, with a thickness of $n$ plus $x$. The thickness $x$ provides an additional amount of metal on each of these cheeks which is preferably equal to the amount of metal which must be removed to correct the shaft for the greatest probable unbalance, as determined by the preliminary survey. The crank shaft 10 is now in condition for balancing.

The operation of determining the inherent unbalance in the shaft 10 may be performed in any suitable way. It is, however, preferably carried out by means of a balancing machine of the type diagrammatically indicated in Fig. 5. In this machine a frame 21 is suitably supported on knife edge pivots 22 from suitable uprights 23 mounted on a base 24, the knife edge pivots 22 being located a substantial distance apart in a transverse plane to give stability to the frame 21. This frame 21 is flexibly held in a substantially horizontal position by any suitable means, such as a flat cantilever spring 26, secured at one end to the base 24 and connected at its other end to a point near the outer end of the pivoted frame 21, as by means of a spring link 27. Adjacent the outer end of the frame 21 is arranged a vertical scale 28, having an adjustable zero mark with which a pointer 29 on the frame 21, normally registers.

Mounted on the frame 21 near the other end thereof is a head stock 31 in which is mounted a driving shaft 32 carrying a suitable chuck 33, which it drives through a flexible coupling 34. The chuck 33 is adapted to make a positive connection with the crank shaft to be tested. The drive shaft 32 is provided with a suitable drive pulley 36, and carries at its outer end a large disc 37, which may be adjustably secured in any angular position with respect to the shaft 32 as by means of a set screw 38. The angular setting of the disc 37 with respect to the shaft 32 may be readily determined by means of a suitable scale 39, provided on an enlargement 41 at the end of the shaft 32, and in which the disc 37 is suitably secured. The outer face of the disc 37 is provided with a radial slot 42 in which a properly calibrated counterweight 43 is slidably mounted. The weight 43 may be secured in any position in the slot 42, as by means of the clamping screw 44, and the distance from the center of the disc 37 along the slot 42 to the center of the weight 43 may be read directly on a scale 46, marked in suitable units and mounted on the disc 37 alongside the slot 42.

The frame 21 is also provided with a pair of similar half bearings 48 and 49, mounted respectively on pedestals 51 and 52 secured to the frame 21. The half bearings 48 and 49 are thus supported at a height such that the shaft to be tested, when laid in them, will be substantially alined with the drive shaft 32 and may be connected to the shaft 32 by means of the chuck 34 thereon at either one of its ends. It is preferably placed in such a position that the pivots 22 lie as closely as possible in the planes of the crank cheeks at which balance is to be effected.

The frame 21 has a natural period of vibration which may be defined as the time for a complete oscillation on the pivots 22, in response to an external impulse. This period is constant and is independent of the amplitude of the swing. Also, each shaft 10 which is to be tested possesses a critical speed of rotation on its own axis in the frame 21, which may be defined as that speed at which the time of one shaft revolution exactly equals the natural period of the frame. It has been discovered that the amplitude of oscillations of the frame 21 on the pivots 22, caused by the unbalance in the shaft 10, and indicated on the scale 28, will be a maximum at the critical speed, and also that the amplitude of oscillations at this speed is in exact proportion to the amount of unbalance inherent in the shaft. This principle enables not only the measurement of the exact amount of unbalance in any convenient units, but also a determination of the exact angular location of the unbalancing force.

The drive shaft or spindle 32, with its chuck 34 and its disc 37, are so constructed as to be in a state of perfect dynamic balance when the counterweight 43 is at the zero mark on the scale 46; that is, when it is at the center of the disc 37. The shaft 10 to be tested is mounted on the frame 21 in the bearings 48 and 49, and is connected by means of the chuck 33 to the driving spindle 32 which is then rotated through the pulleys 36, from any suitable source of power such as an electric motor 52, by a belt 50. It is convenient to drive the shaft 10 at a speed greater than its critical speed, and then release the drive in any convenient way, as by slackening the belt 50. This allows the shaft 10 to slow down and pass through its critical speed, at which speed the amplitude of the oscillations of the frame 21, as indicated on the scale 28, are a maximum. The reading thus obtained on the scale 28 is an index of the unbalanced force, and from it the actual weight of the unbalanced mass may be determined by a simple calculation.

The weight 43 is then set at a point on the scale 46 corresponding to the calibrated reading on the scale 28 and the shaft 10 is again rotated through its critical speed to obtain a second reading on the scale 28. This reading is a function of the angular position of the unbalancing mass with respect to the position of the weight 43, and from the two readings on the scale 28 the correct angular position of the weight 43 to exactly balance the shaft can be easily calculated. The disc 37 is set to the calculated angle and the shaft is again rotated through its critical speed to check the results obtained.

The shaft 10 is then removed from the bearings 48 and 49 and reversed, and the process is repeated with respect to the other correction plane.

The actual unbalance of the shaft being thus determined, the amount of metal that must be removed from each of the correction cheeks in order to produce a resultant force which will just balance the shaft, is calculated. This metal is to be removed in a thin layer, the weight of which must be considered as acting at its center of mass in the position from which it is to be removed. The calculations thus involved, as well as those referred to in connection with the quantitative determination of the unbalance, are of a type well known in the art to which this invention relates, and further description thereof is not deemed necessary.

Having determined the weight of metal which must be removed from each of the cheeks in each correction plane, it is only necessary to grind from the surfaces of these cheeks an amount $b$ sufficient to remove this metal. The metal may be removed from either surface of the cheek or from the periphery thereof by a suitable grinding mechanism. It is preferable, however, to cut the metal from the outer surface 18 of the cheek by a grinding wheel 53, mounted on a spindle 54 which is adapted for rotation on its own axis, and for a feeding motion both radially and axially of the shaft 10 in the well known manner (not shown). The crank shaft is rotated on its own axis during the grinding operation and once in each revolution the crank cheek surface comes into contact with the grinding wheel 53 which takes a fine cut 56 from the face thereof, as clearly shown in Fig. 4.

When sufficient metal has been removed from the crank cheeks so that the shaft is balanced, the thickness of each of the balancing cheeks is $n$ plux $x$ minus $b$. By assumption $x$ represents the maximum amount of metal which may be removed to effect balancing, consequently $x$ is always equal to or greater than $b$. In this way the thickness of the balancing cheeks is never reduced by the grinding operation to a point below that of the minimum allowable cheek thickness $n$, so that danger of weakening the highly stressed cheeks by the removal of too much metal is obviated.

Also, since the metal removed from each of the balancing crank cheeks is in the form of a thin slice, distributed over the entire surface of the cheek, and is not all taken from one spot as is the case with a drilled hole, it is evident that the shaft is in no way disfigured by the operation. In practice, it is seldom that the difference between the cheek thicknesses of a shaft before and after balancing are appreciable to the unaided eye.

Although a specific method has been described, it is to be understood that the invention is not thus limited, but includes modifications and changes which come within the scope of the appended claims.

What is claimed is:

1. The method of making a balanced crank shaft having flat crank cheeks, which consists in making certain predetermined cheeks thicker than the other cheeks, then determining the unbalance of the shaft, and subsequently grinding from the flat sides of said thicker cheeks an amount of metal to compensate for the unbalance of the shaft.

2. The method of balancing a crank shaft which consists in first determining the unbalance, and then grinding the sides of certain predetermined crank cheeks to compensate for said unbalance.

3. The method of making a balanced crank shaft which consists in preliminarily forming certain predetermined crank cheeks thereof of greater thickness than the remainder of the cheeks to arbitrarily throw the unbalance of the shaft into the zone of said cheeks, then determining the unbalance of the shaft, and subsequently grinding from the flat faces of the cheeks an amount necessary to effect balance of the shaft.

4. The method of making a balanced crank shaft which consists in first determining the probable unbalance thereof, then preliminarily forming certain predetermined crank cheeks of the shaft thicker than the remaining cheeks by an amount in excess of the amount of probable unbalance, then determining the actual unbalance of the shaft, and finally removing from the sides of said thicker cheeks an amount of metal sufficient to effect balance without reducing the thickness of said cheeks below the thickness of the other cheeks.

5. The method of balancing a crank shaft which consists in first determining the unbalance, and then removing a uniformly distributed layer of metal from similar portions of certain predetermined crank cheeks to compensate for said unbalance.

6. The method of balancing a crank shaft which consists in first determining the unbalance, then grinding a thin layer of uniformly distributed metal from similar portions of crank cheeks located adjacent predetermined correction planes to compensate for said unbalance.

7. The method of balancing a crank shaft which consists in first determining the necessary correction for unbalance in each of two predetermined correction planes located near the ends of said shaft, then in removing from similar portions of the crank cheeks adjacent each of said planes a uniformly distributed layer of metal to effect the correction for unbalance in that plane.

8. The method of making a balanced crank shaft which consists in increasing the dimensions of certain of the cheeks of said shaft, then determining the unbalance of the shaft, and then removing metal uniformly from certain portions of said enlarged cheeks to compensate for the unbalance without reducing the dimensions of said enlarged cheeks below those of the remaining cheeks.

9. The method of correcting a crank shaft for unbalance which consists in removing from predetermined crank cheeks a uniform layer of metal.

10. The method of correcting a crank shaft for unbalance which consists in removing from similar portions of predetermined crank cheeks a uniform layer of metal.

11. The method of making a balanced crank shaft which consists in initially forming the shaft to arbitrarily throw the unbalance into certain predetermined crank cheeks, then in maintaining such unbalance in said predetermined crank cheeks throughout finishing operations on the shaft, then in determining the actual unbalance, and then in removing metal in a thin layer from similar portions of each of the predetermined cheeks to compensate for said unbalance.

12. The method of making a balance crank shaft which consists in arbitrarily throwing the unbalance into predetermined crank cheeks, in maintaining the unbalance qualitatively in said cheeks during finishing operations on the shaft, then in determining the actual unbalance of the shaft quantitatively, and then in removing metal in a thin distributed layer from certain portions of the predetermined cheeks to compensate for said actual unbalance.

13. The method of producing a balanced crank shaft which consists in maintaining the unbalance qualitatively in certain predetermined crank cheeks during manufacture of the shaft, then determining the unbalance quantitatively, and then in removing uniformly distributed metal from said cheeks to compensate for said unbalance.

14. The method of compensating for the ascertained unbalance of a finished crank shaft which consists in grinding from similar portions of predetermined crank cheeks distributed layers of metal having weights to compensate in the aggregate for the unbalance.

15. The method of balancing a crank shaft having crank cheeks of specified minimum dimensions which consists in removing from certain of said cheeks a distributed layer of metal without reducing any of the cheek dimensions below the specified minimum.

16. The method of balancing a crank shaft having crank cheeks of a specified shape which consists in removing from certain predetermined cheeks sufficient metal to effect balance without altering the shape of said cheeks.

17. The method of producing a balanced crank shaft having cheeks of specified minimum dimensions which consists in first ascertaining the probable unbalance of the shaft, then in choosing correction planes normal to the axis of the shaft, then in forming the crank cheeks adjacent the correction planes larger than the other cheeks by an amount substantially equal in weight to the probable unbalancing mass, then in determining the correction necessary to compensate for actual unbalance, then in proportioning the said correction among the correction planes, then in removing from similar portions of each of the enlarged cheeks a layer of metal to compensate for the unbalance in the adjacent correction plane without reducing any of said cheeks below the specified minimum dimension.

In testimony whereof I affix my signature.

WALTER R. GRISWOLD.